United States Patent [11] 3,628,587

[72] Inventors Kevin B. O'Neil
 4360 Hohman Circle, Akron, Ohio 44319;
 Cameron R. Fraser, 2215 Winter Pky.,
 Cuyahoga Falls, Ohio 44223; Paul E.
 Helms, Jr., SN 527605212 HHC USAA
 RENBD, Fort Knox, Ky. 40121
[21] Appl. No. 30,733
[22] Filed Apr. 22, 1970
[45] Patented Dec. 21, 1971
[73] Assignees Good Year Tire & Rubber Company,
 County of Summit, Ohio

[54] BIAS-BELTED TIRE
 8 Claims, 2 Drawing Figs.
[52] U.S. Cl...................................................... 152/361

[51] Int. Cl....................................................... B60c 9/18
[50] Field of Search............................................. 152/361,
 359

[56] References Cited
 UNITED STATES PATENTS
 2,493,614 1/1950 Bourdon....................... 152/361
 2,930,426 3/1960 Klang............................ 152/361
 2,960,139 11/1960 Engstrom..................... 152/361
 3,516,465 6/1970 Guyot............................ 152/361
 3,548,911 12/1970 Rye et al....................... 152/359

Primary Examiner—Drayton E. Hoffman
Assistant Examiner—D. W. Keen
Attorneys—F. W. Brunner and Harlan E. Hummer ABSTRACT: A bias-belted pneumatic tire having a particular combination of reinforcing belts including a polyester cushion sandwiched between belts of fiberglass.

INVENTORS
KEVIN B. O'NEIL
CAMERON R. FRASER
PAUL E. HELMS, JR.
BY
Harlan E. Hummer
ATTORNEY

BIAS-BELTED TIRE

BACKGROUND OF THE INVENTION

The invention concerns a bias-belted tire, which is preferably tubeless having an air-impermeable inner liner and at least two plies forming the carcass or body of the tire. Each of the carcass plies is reinforced with cords disposed at similar biased angles between the tire beads, which define the circular openings for receiving the wheel rim. A number of rather narrow strips or belts with reinforcing cords at generally lower degree biased angles, are embedded in the tire body in the area of the tread to annularly reinforce the tire. There are any number of combinations of belts and carcass plies for producing desired ride and durability characteristics. The invention is directed to such a combination.

Briefly stated, the invention is in a bias-belted tire having three juxtaposed belts for reinforcing the tire annularly. The belt sandwiched between the other two belts, has polyester reinforcing cords which are different from the fiberglass reinforcing cords of the other belts.

DESCRIPTION OF THE DRAWING

The following description of the invention will be better understood by having reference to the annexed drawing, wherein.

DESCRIPTION OF THE INVENTION

Figure 1:
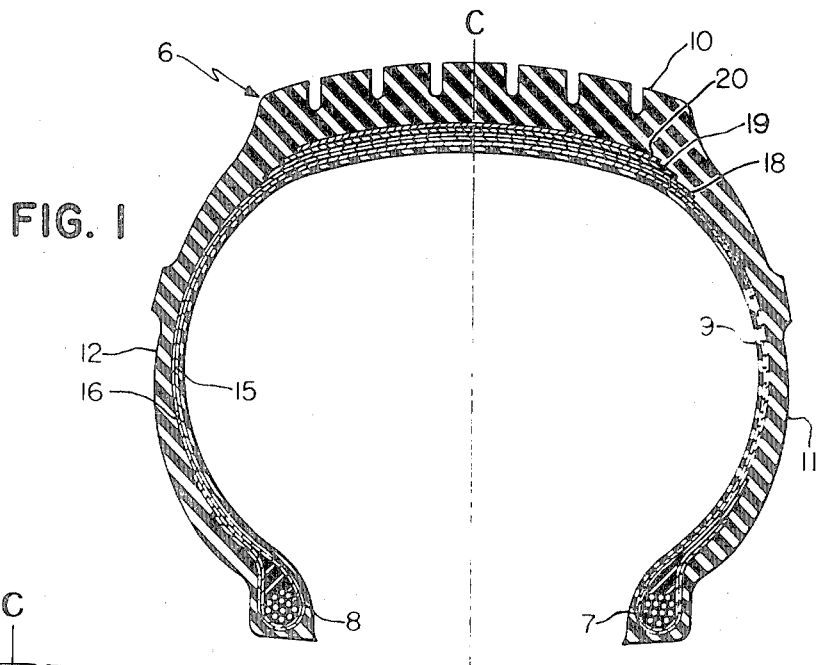
FIG. 1 is a cross-section of a pneumatic tire produced in accordance with the invention.
Figure 2:
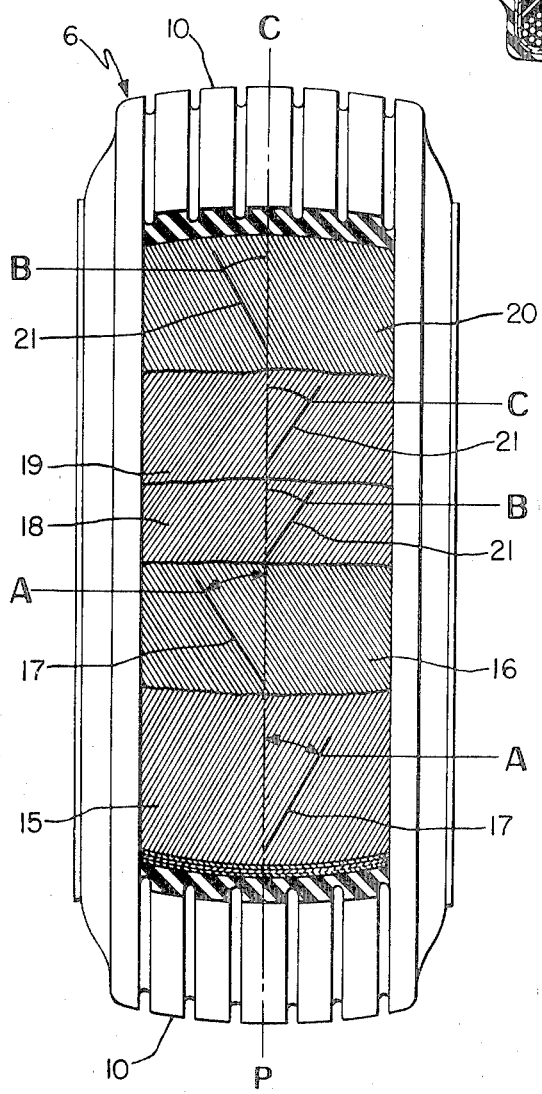
FIG. 2 is a cutaway section of the tire illustrating the angular disposition of the tire cords reinforcing the carcass plies and belts.

Referring more particularly to the drawing, there is shown a pneumatic tire generally indicated at 6, suitable for use on passenger automobiles. The tire 6 is preferably tubeless, but a separate inner tube can be used to hold air, under pressure, within the tire. The tire 6 comprises a pair of annular beads 7 and 8 mountable able on a wheel rim; a bias ply tire body or carcass 9 extending between, and wrapped around the beads 7 and 8; an annular tread 10 carried by the tire carcass 9 in opposed relation to the beads 7 and 8; and a pair of sidewalls 11 and 12 extending from the tread 8 and terminating at the beads 7 and 8.

The configuration of the tire 6 is symmetrical from a plane (C-P) passing through the midcircumferential centerline of the tread 10, such plane hereinafter referred to as the centerplane (CP) of the tire 6.

The tire carcass 9 comprises a plurality of carcass plies 15 and 16 composed of rubberized material reinforced with a number of generally parallel cords, e.g. cord 17. The tire cords 17 are preferably formed from polyester, but can be made from nylon or rayon. The tire cords 17 of the carcass plies 15 and 16 are disposed at angles (A) in a broad range of from about 28° to about 40° and in a preferred range of from about 30° to about 36° measured in opposite directions from the centerplane (CP) of the tire 6, when the tire is cured and uninflated.

A number of belts 18–20 are embedded in the tire 6 in the area of the tread 10 for reinforcing the tire 6 annularly. The belts 18–20 are composed of strips of rubberized material reinforced with a number of generally parallel cords, e.g. cord 21. The tire cords 21 of the innermost belt 18 and outermost belt 20 are, preferably, fiberglass, but can be metal, and are disposed at angles (B) in the broad range of from about 18° to about 38° and in a preferred range of from about 25° to about 30° measured in opposite directions from the centerplane (CP) of the tire 6, when the tire is cured and uninflated. The intermediate belt 19, or the belt sandwiched be between the innermost and outermost belts 18 and 20, has tire cords 21 preferably made from polyester, which has a lower modulus of elasticity than the tire cords of the adjacent belts 18 and 20. The tie cords 21 of the intermediate belt 19 are disposed at angles (C) of from about 20° to about 38° measured from the centerplane (CP) of the tire 6, when the tire is cured and uninflated. The intermediate belt 19 is, preferably, of the same hand as the innermost belt 18, i.e. the angles (B) and (C) are measured in the same direction from the centerplane (CP) of the tire 6.

The polyester cords have a lower modulus of elasticity and are, therefore, more stretchable than the fiberglass or metal cords. Because of this, the polyester belt acts as a shock-absorbing or cushioning pad between the more rigid fiberglass or metal belts. This gives the tire better ride characteristics, which affects the smooth, comfortable riding features of today's automobiles.

While certain representative embodiments and details have been shown for the purpose of illustrating the invention, it will be apparent to those skilled in the art that various changes and modifications may be made therein without departing from the spirit or scope of the invention.

What is claimed is:

1. A bias-belted pneumatic tire comprising in combination,
   a. a pair of carcass plies having reinforcing cords disposed at angles (A) of from about 28° to about 40° measured in opposite directions from the centerplane (CP) of the tire, hen the tire is cured and uninflated;
   b. a pair of belts embedded in the tire in the area of the tread for reinforcing the tire annularly, the belts having reinforcing cords disposed at angles (B) of about 18° to about 38° measured in opposite direction from the centerplane (CP) of the tire, when the tire is cured and uninflated; and
   c. a third belt interposed between said pair of belts, said third belt having reinforcing cords with a lower modulus of elasticity than the reinforcing cords of the pair of belts, the cords of the third belt disposed at angles (C) of from about 20° to about 38° measured from the centerplane (CP) of the tire, when the tire is cured and uninflated.

2. The tire of claim 1, wherein angles (A) are in a preferred range of from about 30° to about 36°.

3. The tire of claim 2, wherein angles (B) are in a preferred range of from about 25° to about 30° degrees.

4. The tire of claim 1, wherein the reinforcing cords of the carcass plies are polyester.

5. The tire of claim 4, wherein the cords of the third belt are composed of polyester.

6. The tire of claim 5, wherein the reinforcing cords of the pair of belts are composed of fiberglass.

7. The tire of claim 6, wherein the cord angle (C) is measured from the centerplane (CP) of the tire in the same direction as cord angle (B) of the cords closest the cords of the carcass plies.

8. The tire of claim 5, wherein the reinforcing cords of the pair of belts are composed of metal.

* * * * *